PHONOGRAPH RECORD PLAYER CONTROL

Filed Nov. 19, 1947 3 Sheets-Sheet 1

INVENTOR
JAMES E. VISTAIN JR.
BY J. N. Douglas
HIS ATTORNEY

Jan. 2, 1951 J. E. VISTAIN, JR 2,536,477

PHONOGRAPH RECORD PLAYER CONTROL

Filed Nov. 19, 1947 3 Sheets-Sheet 2

INVENTOR
JAMES E. VISTAIN JR.
BY J. D. Douglass
HIS ATTORNEY

Jan. 2, 1951 J. E. VISTAIN, JR 2,536,477

PHONOGRAPH RECORD PLAYER CONTROL

Filed Nov. 19, 1947 3 Sheets-Sheet 3

INVENTOR.
JAMES E. VISTAIN JR.
BY
J. W. Douglass
HIS ATTORNEY

Patented Jan. 2, 1951

2,536,477

UNITED STATES PATENT OFFICE 2,536,477

PHONOGRAPH RECORD PLAYER CONTROL

James E. Vistain, Jr., Chicago, Ill., assignor to Admiral Corporation, Chicago, Ill., a corporation of Delaware Application November 19, 1947, Serial No. 786,933

2 Claims. (Cl. 274—10)

This invention relates to phonograph record player controls and in particular to a control by the operation of which a record player is adapted to be started and/or stopped automatically. More especially, the control is adapted to stop the operation of the record player after one or more records, with which it has been loaded, have been reproduced.

The invention may be advantageously incorporated in a record player of the so-called automatic variety, one form of which is disclosed in the copending application of George E. Redfield, S. N. 776,264, filed September 26, 1947. In the player of said applicant, a stack of records are supported at their peripheries by a side support and at their center holes by a shouldered spindle, centrally of a turntable. The records are sustained by the spindle and are dropped one at a time, each successive bottom record of the stack being guided to the turntable by the spindle after it has been dislodged from its supports by suitable ejector mechanism.

In the present record player, provision is contemplated for so mounting the spindle that it is slidable axially in its supports, between predetermined limits, and is thus adapted to occupy either of two positions, one of which, its normal position, it is adapted to occupy when free of the weight of records while the weight of but one record resting on the shoulder of the spindle is adapted to slide the spindle to the other position. Some instrumentality which is suitable for interrupting the transfer of motive force from its source to drivable mechanism of the record player is employed, and advantage is taken of the position to which the spindle is displaceable for controlling said instrumentality. Provision is also made for playing a final record after the spindle has been relieved of its weight, the provision involving time-delay mechanism due to which the spindle remains in the position it occupies during playing of previous records of the stack and until after reproduction of the final record.

Although record players which are capacitated to automatically cease operation once playing of a final record has been discontinued, are known to the phonograph art, the mechanisms adopted, for providing the record players with this feature, have been intricate and expensive, since they usually involved a considerable addition of special parts which are subject to wear or maladjustment.

In the present invention, but little change in the spindle, from spindles of known construction, is involved, in order that said spindle may be capacitated to slide axially within predetermined limits and thereby provide for discontinuance of the record player's operation when a final record, usually of a group of the same, has been reproduced. Furthermore, the parts that are additionally necessary, to add the control feature to a record player, are few in number, simple of construction and their interrelationship so novel that the control adds little to the cost of manufacture of a record player.

Other advantages of the invention will be apparent from the following specification when considered in conjunction with the accompanying drawings in which.

Figure 1:
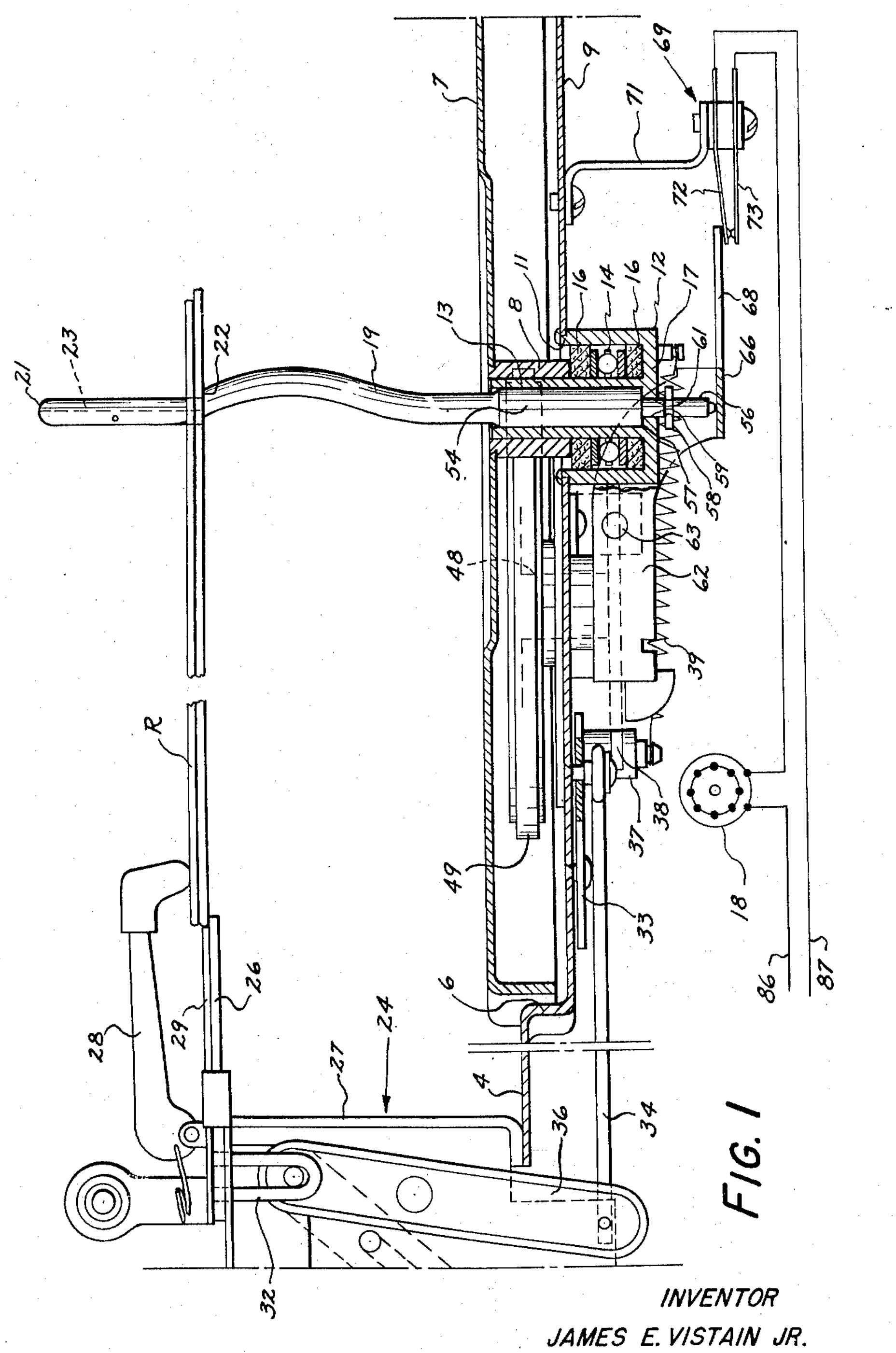
Fig. 1 is a view, partly diagrammatic and partly a vertical section taken approximately on line 1—1 of Fig. 2.
Figure 2:
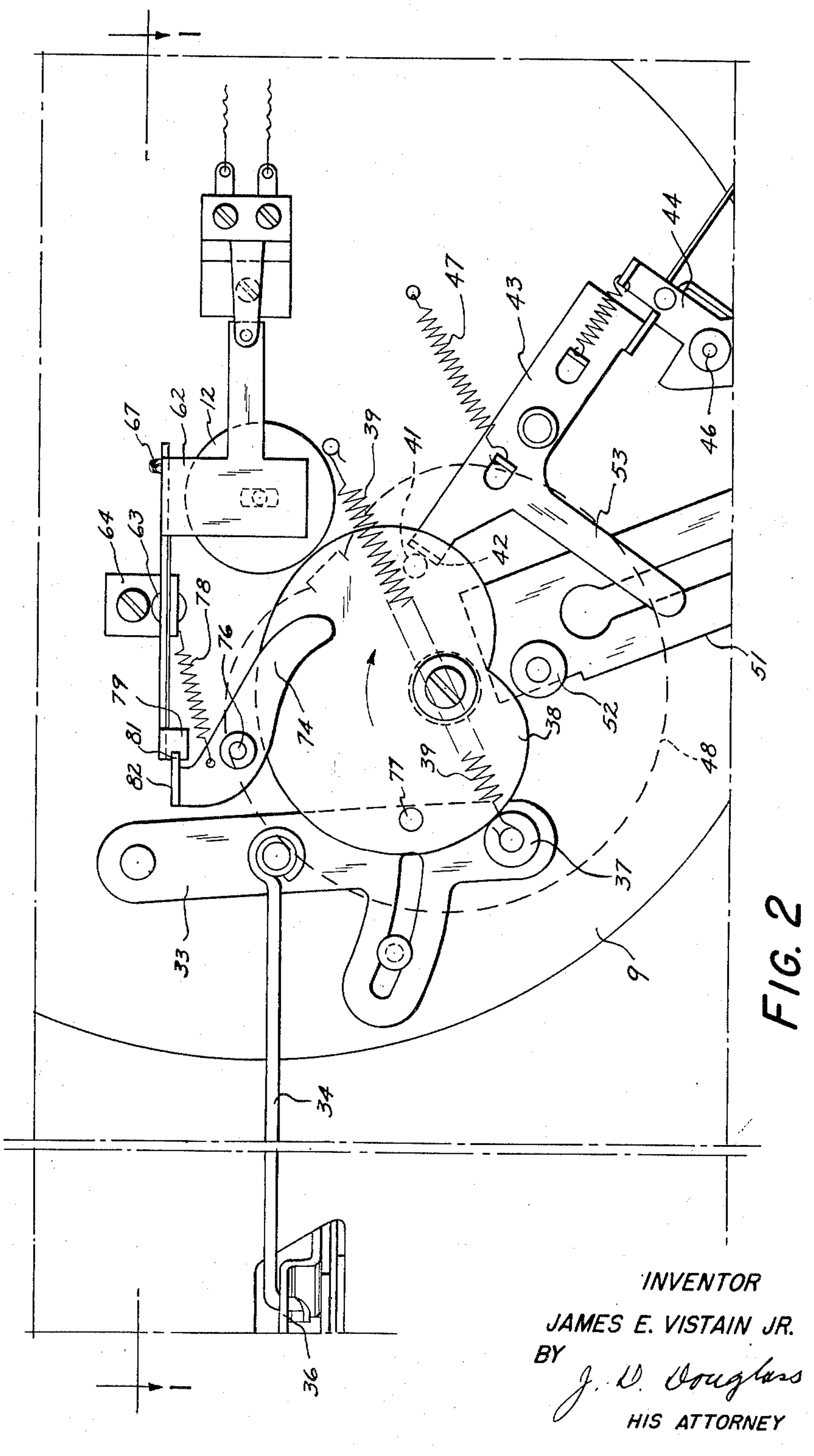
Fig. 2 is a fragmentary bottom plan view of the invention.

In Figs. 1 and 2, wherein for the purpose of illustration, is shown one embodiment of the invention, the reference character 4 is used to denote the chassis plate or motor board of an automatic record player. The plate 4 includes a well or depression 6 to accommodate a turntable 7 having a hub 8. A horizontal bottom wall 9 of the well 6 is apertured at 11 while a mounting member 12, conveniently coupled to the wall 9 at the apertured region, also includes an upstanding sleeve portion 13 on which the hub 8 is rotatably journaled. In order to withstand axial downward thrust of the hub 8, and still provide ease of rotation for the turntable, a ball bearing 14 is employed, which bearing is sandwiched between suitable anti-vibration washers 16, one of which rests against a bottom horizontal wall 17 of the mounting member 12 while another is between the hub 8 and bearing.

The turntable 7 is rotated by a motor 18, indicated diagrammatically, drivingly coupled by mechanism, not shown, to said turntable.

The sleeve 13 provides support for a spindle 19, which spindle has extending upwardly thereof, a portion 21 which also extends beyond a shoulder 22 upon which the records of a stack R are adapted to rest after they have been disposed over the portion 21. The records R are further normally retained in engagement with the shoulder 22 by a vertical slidable member 23, in accordance with the construction disclosed in a copending application filed July 2, 1943, in the name of Willard Faulkner, Ser. No. 493,242, now Patent No. 2,498,333, issued February 21, 1950. Cooperatively associated with the spindle 19 is an ejector head 24, the construction of which will not be fully described since it is fully dealt with in the before mentioned application of George E. Redfield. In view of this, however, it is timely to state that the ejector head includes a horizontal plate 26 which is shiftable toward and away from the spindle 19, and which is spaced from the chassis plate 4 by a vertical column 27. The records R, at their circumferential edges, are adapted to be pressed against the plate 26 by a hold-down lever 28 and the bottom member of the stack R is intermittently displaced to the right by a push plate 29 to dislodge said bottom member from the support of both plate 26 and shoulder 22, whereupon the dislodged record is guided to the turntable 7 by the spindle 19.

Means to oscillate the push plate 29 is also in accordance with the construction disclosed in the application of George E. Redfield, previously referred to. Briefly, the means for oscillating the push plate includes a slotted lug 32, on the push plate 29, which is operably coupled to a lever 33 pivoted to the plate 9, by a link 34 and lever 36. The lever 33 bears a follower 37 which is constantly pressed against a cam 38 by a tension spring 39, thereby urging a pin 41 carried by the cam, Fig. 2, against a stop 42 on a latch lever 43. At the same time, the spring 39 holds the push plate 29 in retracted position; that is, to the left (Fig. 1).

When a trigger 44 is swung, manually or automatically, about a pivot 46 a tension spring 47 frees the stop 42 from engagement with the pin 41 long enough for the pin to be carried past the stop, due to the force of spring 39. Since a shaft 48 rigidly couples the cam 38 to a friction wheel 49 having a notched periphery, and the consequent rotation imparted to the friction wheel by spring 39 is adequate to provide driving engagement between the constantly driven hub 8 and friction wheel the cam is rotated through a complete revolution. In so rotating, the cam 38 moves a tone arm manipulating slider 51 against force of a spring, not shown, by engaging a follower 52 on the slider. In the course of reciprocation of the follower 52, the spring 47 returns the latch lever 43 to its normal position, the operation involving engagement of an extension 53, of the latch lever 43, with the follower 52. After the pin 41 has been carried through its orbit, by cam 38, it again strikes the stop 42, the cam thus completing a cycle of operation.

The spindle 19 is slidable axially within limits and restrained from rotation. That this may be carried into effect, the spindle is provided with a portion for sliding engagement in the sleeve 13 which is preferably of slightly greater diameter as indicated at 54. The portion 54 terminates in a shoulder 57 adapted to abut the bottom wall 17 of bearing 12, thereby limiting downward movement of the spindle. The end of the spindle is provided with a flattened portion 56 which extends through the wall 17. Upward movement of the spindle is limited by a pin or clip 58 carried by the flattened portion of the spindle below and spaced from the wall 17 when the shoulder 57 is in abutment with the wall. The flattened portion of the spindle extends through the wall 17 and is in intimate contact with flat surfaces 59 defining the walls of an aperture 61 in the wall 17 which prevents rotation of the spindle.

Figure 3:
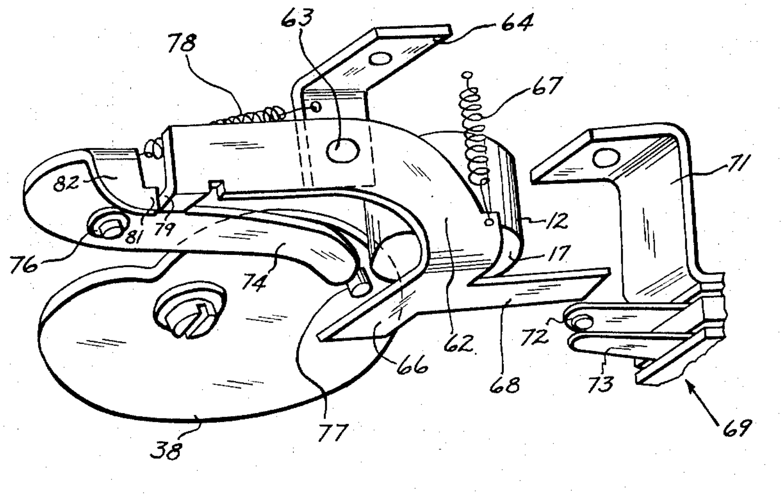
Fig. 3 is a view of elements of the invention, in perspective, as viewed from below the level of the elements.

Means by which the spindle 19 is normally held in an elevated position when no records are on the spindle; that is, in a position wherein the clip 58 abuts the wall 17, is provided. To thus support the spindle 19, I provide a latch lever 62 which is adapted to rock about a substantially horizontal axis provided by a pivot 63 carried on a bracket 64, adjacent the mounting member 12, by which the latch lever is supported from the plate 9. From the region of its pivotal support, the lever 62 curves downwardly toward the right and is provided with a horizontal portion 66 (Fig. 3), that extends under the portion 56 of the spindle 19 and on which the spindle is adapted to rest. A tension spring 67, anchored to the plate 9 and the lever 62 biases said lever anticlockwise about its pivot 63. The biasing force of spring 67 is adequate to hold the weight of the spindle in an upward position in which the pin 58 is pressed against the wall 17 of the bearing 12. When, however, but a single 10-inch record is placed on the spindle, the weight of the record is sufficient to stretch the spring 67 and move the spindle to its lower position (Fig. 1).

Advantage is taken of the position to which the latch lever 62 is moved, to control operation of the record player. The horizontal portion 66 of the latch lever includes a laterally extending finger 68 that extends in operative relation to a switch 69. The switch 69 is supported from the plate 9 by a bracket 71 and is connected in series with the motor 18. The switch is open when the spindle is in a raised position. The switch 69, as illustrated, includes contacts 72 and 73, one of which is adapted to be pressed against the other by the finger 68 to close the circuit and thereby provide for operation of the motor. A mercury switch adapted to be operated by movement of the lever 62 is also contemplated in place of that illustrated. As long as one or more records are supported on the shoulder 22 of the spindle, the lever 62 is in its lower position, with the arm 68 engaging the upper contact carrying arm holding the switch closed. If desired, the arm 68 may carry a piece of insulation material on its underside for engagement with the switch. Furthermore, it is quite within the purview of my invention to have the arm 68 carry the contact and be a part of the switch 69.

Means is also employed to delay upward movement of the spindle 19, after the last record to remain on the shoulder 22 has been dropped to the turntable so that the opening of the circuit will not take place before the record has been played. Accordingly, delay or time delay mechanism is employed to provide for this. The delay mechanism includes a trigger lever 74 adapted to swing about a pivot 76, adjacent the cam 38, on the plate 9. The cam 38 carries a pin 77 extending from one of its sides, and the lever 74 extends into the course that the pin 77 is adapted to be carried through during a cycle of rotation of the cam. It therefore follows that every time the cam 38 revolves the pin 77 engages the lever 74 which is rocked about its pivot 76 against the resistance of a tension spring 78 for biasing the lever clockwise into engagement with the latch lever 62. In order that this may be operatively effected, the lever 62, at one end thereof, includes a laterally extending lug 79 adapted to be engaged by a tooth 81 forming an integral part of a downwardly bent portion 82 of the lever 74.

In detail, the operation of the invention is as follows: Assuming the spindle 19 is in an upward position, records of a group R, for example, are threaded over the portion 21 of the spindle so that they are supported at their center on the shoulder 22 and at the edges on the plate 26 of the ejector mechanism. Since the weight of the records is adequate to overcome the resistance of spring 67, the spindle is displaced to its downward position upon which the latch lever 62 is rocked clockwise. The arm 68 thereby closes the switch 69 which provides for flow of electric current from a suitable source available over wires 86 and 87 to the motor 18 which then starts. If the tone arm is in playing position, i. e., in a position directly below the sound grooves of the records R, it will be necessary to start the cam 38 rotating by manually rocking the trigger lever 44. The latter operation causes push plate 29 to dislodge a record from its supports from which the record drops to the turntable where it is played. Thereafter the reproducer mechanism and ejector mechanism operate automatically in effective sequence until the last record of the stack R has been dropped to the turntable. In the meantime, the tooth 81 is disengaged from the lug 79 by the pin 77 on the cam 38 every time the cam makes a revolution. The tooth 81 is enabled to readily re-engage the lug, however, as long as there is a record exerting downward force on the spindle 19. When the final record has been transferred to the turntable sufficient downward pressure on the spindle, to rock lever 62 clockwise, is removed. The spring 67 is unable to immediately rock lever 62 counterclockwise, however, because of the holding engagement between tooth 81 and lug 17. It is not until the tone arm of the record player reaches the terminal groove of the final record which gives rise to rotation of cam 38, as previously described, that the force tension spring 67 becomes effective for rocking the lever 62 counter clockwise, and this is occasioned by momentary disengagement of tooth 81 from lug 79 and pin 77 hits lever 74. The spindle then is displaced to its upward position, with consequent opening of switch 69.

Having thus described my invention in an embodiment thereof, I am aware that numerous and extensive departures may be made therefrom without departing from the spirit or scope of the appended claims.

I claim:

1. In an automatic record player having a base, a turntable rotatably mounted on said base and a motor in driving engagement with said turntable; means to stop said motor after the playing of the last record of a stack comprising a spindle slidably mounted in said base centrally of said turntable, stop means on said spindle to define the limits of its slidable movement, latch means pivotally mounted on said base having a part extending beneath said spindle in position to be engaged thereby, resilient means engaged between said latch means and said base to urge said part of said latch means upward and thereby hold said spindle in its upward position when unloaded, said resilient means being of such strength that a single record on said spindle will move said spindle to its lower position, switch means in electrical circuit with said motor mounted on said base, an arm on said latch means adapted to engage said switch means to close said circuit when said latch means is in its lower position, trigger means pivotally mounted on said base having a hook part formed to engage said latch means to hold it in its lower position, biasing means engaging said trigger means to urge it normally to its holding engagement with said latch means, and cam means movably mounted on said base having a part thereon located to engage said trigger means and thereby to release it from its holding engagement with said latch means, said cam means being moved during the change cycle of said record player.

2. In an automatic record player having a base, a turntable rotatably mounted on said base, a motor in driving engagement with said turntable and operating means for said player driven by said motor; means to stop said motor after the playing of the last record of a stack comprising a spindle slidably mounted in said base centrally of said turntable, a stop means on said spindle to define the limits of its slidable movement, latch means pivotally mounted on said base having a part extending beneath said spindle in position to be engaged thereby, resilient means engaged between said latch means and said base to urge said part of said latch means upward and thereby hold said spindle in its upward position when unloaded, said resilient means being of such strength that a single record on said spindle will move said spindle to its lower position, switch means in electrical circuit with said motor mounted on said base, an arm on said latch means adapted to engage said switch means to close said circuit when said latch means is in its lower position, trigger means pivotally mounted on said base being formed to engage said latch means to hold it in its lower position, biasing means engaging said trigger means to urge it normally to its holding engagement with said latch means, and cam means movably mounted on said base and moved by said operating means, said cam means having a part thereon located to engage said trigger means and thereby to release it from its holding engagement with said latch means in timed relation to said operating means so that said trigger means is tripped before the record is changed.

JAMES E. VISTAIN, Jr.

REFERENCES CITED

The following references are of record in the file of this patent:

UNITED STATES PATENTS

| Number | Name | Date |
|---|---|---|
| 2,331,383 | Faulknet | Oct. 12, 1943 |

FOREIGN PATENTS

| Number | Country | Date |
|---|---|---|
| 459,208 | Great Britain | Jan. 4, 1937 |
| 71,080 | Norway | Oct. 7, 1946 |